United States Patent
Woo et al.

(10) Patent No.: US 10,125,241 B2
(45) Date of Patent: Nov. 13, 2018

(54) POLYCARBONATE RESIN COMPOSITION AND MOLDED ARTICLE PRODUCED THEREFROM

(71) Applicant: Lotte Advanced Materials Co., Ltd., Yeosu-si (KR)

(72) Inventors: Eun Taek Woo, Uiwang-si (KR); Eric Arifin, Uiwang-si (KR); Jung Ki Kim, Uiwang-si (KR); Na Ri Park, Uiwang-si (KR); Mi Rae Jang, Uiwang-si (KR); Yoo Jin Jung, Uiwang-si (KR); Sang Hyun Hong, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 110 days.

(21) Appl. No.: 15/138,560

(22) Filed: Apr. 26, 2016

(65) Prior Publication Data

US 2016/0319108 A1     Nov. 3, 2016

(30) Foreign Application Priority Data

Apr. 30, 2015 (KR) .................. 10-2015-0061622
Mar. 22, 2016 (KR) .................. 10-2016-0034282

(51) Int. Cl.
*C08K 5/5399* (2006.01)
*C08K 3/22* (2006.01)

(52) U.S. Cl.
CPC ............. *C08K 5/5399* (2013.01); *C08K 3/22* (2013.01); *C08K 2003/2248* (2013.01); *C08K 2003/2251* (2013.01)

(58) Field of Classification Search
CPC .................. C08K 5/5399; C08K 3/22
See application file for complete search history.

(56) References Cited

U.S. PATENT DOCUMENTS

| | | | |
|---|---|---|---|
| 8,309,640 B2* | 11/2012 | Li | C08K 3/0008 524/404 |
| 8,841,367 B2 | 9/2014 | Zheng et al. | |
| 8,895,649 B2 | 11/2014 | Li et al. | |
| 8,916,637 B2 | 12/2014 | Van Hartingsveldt et al. | |
| 8,927,661 B2 | 1/2015 | Li et al. | |
| 9,006,306 B2 | 4/2015 | La Camera et al. | |
| 9,018,286 B2 | 4/2015 | Daga et al. | |
| 9,023,923 B2 | 5/2015 | An et al. | |
| 9,346,941 B2 | 5/2016 | Woo et al. | |
| 9,394,483 B2 | 7/2016 | Wu et al. | |
| 2003/0040643 A1* | 2/2003 | Nakano | C07F 9/65812 564/16 |
| 2009/0292048 A1* | 11/2009 | Li | C08L 55/02 524/115 |
| 2013/0115529 A1 | 5/2013 | Zhang et al. | |
| 2015/0183958 A1* | 7/2015 | Woo | C08K 5/5399 524/116 |

FOREIGN PATENT DOCUMENTS

| | | |
|---|---|---|
| CN | 102066473 A | 5/2011 |
| CN | 104744915 A | 7/2015 |
| JP | 2010-536947 A | 12/2010 |
| KR | 10-2009-0018569 A | 2/2009 |
| KR | 10-2011-0018319 A | 2/2011 |
| WO | 20013/177558 A1 | 11/2013 |

OTHER PUBLICATIONS

Office Action in counterpart Chinese Application No. 201610270898.3 dated Jul. 6, 2017, pp. 1-6.

* cited by examiner

*Primary Examiner* — Arrie L Reuther
(74) *Attorney, Agent, or Firm* — Additon, Higgins & Pendleton, P.A.

(57) ABSTRACT

A polycarbonate resin composition and a molded article manufactured using the same. The polycarbonate resin composition includes: a polycarbonate resin; a metal compound; and a glass transition temperature regulator, wherein the glass transition temperature regulator contains phosphorus. The polycarbonate resin composition and a molded article manufactured using the same can have excellent properties in terms of impact resistance, flowability, and plating adhesive strength.

8 Claims, No Drawings

POLYCARBONATE RESIN COMPOSITION AND MOLDED ARTICLE PRODUCED THEREFROM

CROSS-REFERENCE TO RELATED APPLICATION

This application claims priority under 35 USC Section 119 to and the benefit of Korean Patent Application 10-2015-0061622, filed on Apr. 30, 2015, and Korean Patent Application 10-2016-0034282, filed on Mar. 22, 2016, the entire disclosure of each of which is incorporated herein by reference.

FIELD

The present invention relates to a polycarbonate resin composition and a molded article manufactured using the same.

BACKGROUND

A thermoplastic resin such as polycarbonate resin has a lower specific gravity than glass or metal and can have excellent moldability and mechanical properties such as impact resistance. Plastic products using such a polycarbonate resin are rapidly replacing glass or metal products in the fields of electric/electronic products and automotive parts.

Recently, studies have been done on technology for forming desired fine patterns at a desired position by introducing a material as an additive that is capable of providing processability for direct coating or laser structuring to a thermoplastic resin.

For example, an antenna of a smartphone requires a separate electrode for each frequency bandwidth. In order to realize fine patterns corresponding to frequency bands, laser direct structuring (LDS) technology using such an additive is widely used. This technology has an advantage in terms of internal design, with the trend of reduction in smartphone thickness.

In addition, with the trend of reduction in smartphone thickness, a thermoplastic resin is required to have excellent flowability so as to secure good moldability.

To this end, there has been proposed reducing the molecular weight of a thermoplastic resin to improve flowability. However, this method has a problem in that, as the molecular weight is reduced, the resin becomes more brittle, thereby causing deterioration in impact resistance.

Therefore, in order to overcome these problems, there is a need for a thermoplastic resin composition having excellent properties in terms of impact resistance and plating adhesive strength while exhibiting excellent flowability and thus moldability.

SUMMARY OF THE INVENTION

Exemplary embodiments relate to a polycarbonate resin composition which can exhibit excellent properties in terms of impact resistance, flowability and plating adhesive strength, and a molded article manufactured using the same. For example, embodiments of the polycarbonate resin composition can exhibit improved plating adhesive strength and processability, thereby facilitating formation of fine patterns, by adding a metal compound to a polycarbonate resin; can exhibit improved flowability and thus moldability, thereby allowing injection molding of micro-components and enhancing plating adhesive strength by adding an optimal glass transition temperature regulator; and can secure good properties while providing excellent properties in terms of impact resistance and the like through optimal combination of components, and a molded article manufactured using the same.

The polycarbonate resin composition includes: a polycarbonate resin; a metal compound; and a glass transition temperature regulator, wherein the glass transition temperature regulator contains phosphorus.

In exemplary embodiments, the glass transition temperature regulator may be a compound represented by Formula 1:

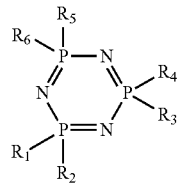

[Formula 1]

wherein $R_1$ to $R_6$ are the same or different and are each independently a hydrogen atom, a halogen atom, a substituted or unsubstituted $C_1$ to $C_{20}$ alkyl group, a substituted or unsubstituted $C_2$ to $C_7$ alkenyl group, a substituted or unsubstituted $C_3$ to $C_{20}$ cycloalkyl group, a substituted or unsubstituted $C_2$ to $C_{20}$ heterocycloalkyl group, a $C_1$ to $C_{20}$ alkoxy group, a $C_6$ to $C_{20}$ aryl group, a $C_5$ to $C_{20}$ heteroaryl group, a substituted or unsubstituted $C_3$ to $C_{20}$ alkoxycarbonylalkyl group, a substituted or unsubstituted $C_2$ to $C_{10}$ carbonylalkyl group, an amino group, or a hydroxyl group.

In exemplary embodiments, the polycarbonate resin composition may include: about 75 wt % to about 95 wt % of the polycarbonate resin; about 1 wt % to about 15 wt % of the metal compound; and about 1 wt % to about 10 wt % of the glass transition temperature regulator.

In exemplary embodiments, the metal compound may include at least one of a metal oxide, a heavy metal complex oxide, and a copper salt.

In exemplary embodiments, the metal compound may have a spinel structure.

The metal oxide may include at least one of copper oxide, zinc oxide, tin oxide, magnesium oxide, aluminum oxide, gold oxide, and silver oxide.

In exemplary embodiments, a weight ratio of the metal compound to the glass transition temperature regulator may range from about 1:about 1 to about 5:about 1.

In exemplary embodiments, the polycarbonate resin composition may further include at least one of antibacterial agents, heat stabilizers, antioxidants, release agents, photostabilizers, inorganic additives, surfactants, coupling agents, plasticizers, compatibilizers, lubricants, antistatic agents, colorants, dyes, pigments, flame retardants, flame retardant aids, anti-dripping agents, weathering stabilizers, UV absorbers, UV blockers, and combinations thereof.

In exemplary embodiments, the polycarbonate resin composition may have a plating peel strength of about 1.35 N/mm or higher, as measured on a plate-type injection molded specimen having a size of about 1 mm×about 5 cm×about 5 cm (thickness×width×length) and left for aging at room temperature for 6 hours using a tensile tester after a surface of the specimen is activated in a stripe pattern using a laser, followed by Cu electroless plating to a thickness of about 35 μm.

In exemplary embodiments, the polycarbonate resin composition may have an impact resistance of about 50 cm to about 100 cm, as measured on a plate-type injection molded specimen having a size of about 1 mm×about 5 cm×about 5 cm (thickness×width×length) and left for aging at room temperature for 6 hours using a falling weight impact tester with a 500 g weight in accordance with the DuPont drop test method, in which the impact resistance is determined by impacting 20 specimens with the weight to measure a height of the weight at which about 50% of each specimen is broken, followed by averaging values of the height.

In exemplary embodiments, the polycarbonate resin composition may have a flow length (spiral flow length) of about 100 mm to about 300 mm, as measured on a specimen prepared by injection molding under conditions of a molding temperature of about 310° C., a mold temperature of about 60° C., an injection pressure of about 50%, and an injection rate of about 50% using a spiral mold having a size of about 1 mm×about 1 cm (thickness×width).

Other embodiments relate to a molded article. The molded article is manufactured using the polycarbonate resin composition as set forth above.

DETAILED DESCRIPTION

Exemplary embodiments now will be described more fully hereinafter in the following detailed description, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

In accordance with exemplary embodiments, a polycarbonate resin composition includes: (A) a polycarbonate resin; (B) a metal compound; and (C) a glass transition temperature regulator.

(A) Polycarbonate Resin

The polycarbonate resin may include any typical polycarbonate resin and may be, for example, an aromatic polycarbonate resin prepared by reacting a carbonate precursor, such as phosgene, halogen formate, and/or carbonic diester with one or more diphenols represented by Formula 2:

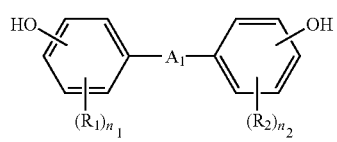

[Formula 2]

wherein $A_1$ is a single bond, a substituted or unsubstituted $C_1$ to $C_5$ alkylene group, a substituted or unsubstituted $C_2$ to $C_5$ alkylidene group, a substituted or unsubstituted $C_3$ to $C_6$ cycloalkylene group, a substituted or unsubstituted $C_5$ to $C_6$ cycloalkylidene group, CO, S, or $SO_2$; $R_1$ and $R_2$ are the same or different and are each independently a substituted or unsubstituted $C_1$ to $C_{30}$ alkyl group or a substituted or unsubstituted $C_6$ to $C_{30}$ aryl group; and $n_1$ and $n_2$ are the same or different and are each independently an integer from 0 to 4.

As used herein, the term "substituted" means that a hydrogen atom in a functional group is substituted with a substituent such as a halogen group, a $C_1$ to $C_{30}$ alkyl group, a $C_1$ to $C_{30}$ haloalkyl group, a $C_6$ to $C_{30}$ aryl group, a $C_2$ to $C_{30}$ heteroaryl group, a $C_1$ to $C_{20}$ alkoxy group, and combinations thereof.

Examples of the diphenols may include without limitation hydroquinone, resorcinol, 4,4'-dihydroxyphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane, and the like, and combinations thereof. For example, the diphenols may include 2,2-bis-(4-hydroxyphenyl)-propane, 2,2-bis-(3,5-dichloro-4-hydroxyphenyl)-propane, 1,1-bis-(4-hydroxyphenyl)-cyclohexane, and the like, and combinations thereof, for example 2,2-bis-(4-hydroxyphenyl)-propane, which is also referred to as bisphenol A.

In exemplary embodiments, the polycarbonate resin may have a weight average molecular weight (Mw) of about 10,000 g/mol to about 200,000 g/mol, for example, about 15,000 g/mol to about 80,000 g/mol, as measured by gel permeation chromatography, without being limited thereto.

The polycarbonate resin may include a linear polycarbonate resin, a branched polycarbonate resin, and/or a polyester carbonate copolymer resin. Examples of the linear polycarbonate resin may include a bisphenol A polycarbonate resin. Examples of the branched polycarbonate resin may include a polycarbonate resin prepared by adding a tri- or higher polyfunctional compound, for example, a tri- or higher valent phenol group-containing compound in an amount of about 0.05 parts by mole to about 2 parts by mole based on about 100 parts by mole of the diphenols. The polyester carbonate copolymer resin may be prepared by reacting a bifunctional carboxylic acid with diphenol and carbonate, wherein the carbonate may be a diaryl carbonate such as diphenyl carbonate and/or ethylene carbonate.

In exemplary embodiments, the polycarbonate resin may include a homopolycarbonate resin, a copolycarbonate resin, and/or a blend of one or more copolycarbonate resin(s) and/or one or more homopolycarbonate resin(s).

In exemplary embodiments, the polycarbonate resin composition can include the polycarbonate resin (A) in an amount of about 75 wt % to about 95 wt %, for example, about 80 wt % to about 90 wt %, and as another example about 85 wt % to about 90 wt %, based on the total weight (100 wt %) of the polycarbonate resin composition including the polycarbonate resin (A), the metal compound (B), and the glass transition temperature regulator (C) ((A)+(B)+(C)). In some embodiments, the polycarbonate resin composition can include the polycarbonate resin (A) in an amount of about 75, 76, 77, 78, 79, 80, 81, 82, 83, 84, 85, 86, 87, 88, 89, 90, 91, 92, 93, 94, or 95 wt %. Further, according to some embodiments of the present invention, the polycarbonate resin (A) can be present in an amount of from about any of the foregoing amounts to about any other of the foregoing amounts.

Within this range, the polycarbonate resin can properly serve as a base resin, and the polycarbonate resin composition can exhibit excellent properties in terms of moldability and plating adhesive strength.

(B) Metal Compound

The metal compound is a material that is activated under light by stimulated emission to provide coatability and processability to the polycarbonate resin and can allow direct coating or laser structuring. As used herein, the term "light by stimulated emission" refers to light amplified by stimulated emission. Light by stimulated emission may be UV light at a wavelength of about 100 nm to about 400 nm, visible light at a wavelength of 400 nm to about 800 nm, and/or infrared light at a wavelength of about 800 nm to about 25,000 nm, for example, X-rays, gamma-rays, and/or particle beams (electron-beams, α-particle beams, and/or β-particle beams), for example, infrared light at a wavelength of about 1,064 nm.

In the metal compound placed on a surface of the polycarbonate resin composition, metal atoms included in the metal compound as nucleating agents can be activated when exposed to light by stimulated emission. As a result, since a region exposed to light by stimulated emission is activated by the metal atoms, the region exposed to light by stimulated emission can form a conductive structure.

Examples of the metal compound may include without limitation metal oxides, heavy metal complex oxides (which are not the same as the metal oxides), copper salts, and the like, and combinations thereof.

In exemplary embodiments, the metal compound may have a spinel structure.

Examples of the metal oxide may include without limitation copper oxide, zinc oxide, tin oxide, magnesium oxide, aluminum oxide, gold oxide, silver oxide, and the like, and combinations thereof.

In exemplary embodiments, the heavy metal complex oxide may be represented by Formula 3:

$$AB_2O_4 \quad \text{[Formula 3]}$$

wherein A is cadmium, chromium, manganese, nickel, zinc, copper, cobalt, iron, magnesium, tin, or titanium; and B is chromium, iron, aluminum, nickel, manganese, molybdenum, antimony, bismuth, or tin.

In the heavy metal complex oxide represented by Formula 3, A may provide a monovalent cation component of a metal oxide cluster; B may provide a monovalent cation component of a metal oxide cluster; the metal oxide cluster including A may have a tetrahedral structure; and the metal oxide cluster including B may have an octahedral structure. In addition, the heavy metal complex oxide represented by Formula 3 may have a structure in which oxygen anions are arranged in a cubic close-packed lattice, and B and A respectively occupy octahedral and tetrahedral sites in the lattice.

Examples of the heavy metal complex oxide may include without limitation magnesium aluminum oxide ($MgAl_2O_4$), zinc aluminum oxide ($ZnAl_2O_4$), iron aluminum oxide ($FeAl_2O_4$), copper iron oxide ($CuFe_2O_4$), copper chromium oxide ($CuCr_2O_4$), manganese iron oxide ($MnFe_2O_4$), nickel iron oxide ($NiFe_2O_4$), titanium iron oxide ($TiFe_2O_4$), iron chromium oxide ($FeCr_2O_4$), magnesium chromium oxide ($MgCr_2O_4$), and the like, and combinations thereof. For example, when a final molded article is required to be black or grey, the heavy metal complex oxide may be copper chromium oxide ($CuCr_2O_4$), which has a dark color.

Examples of the copper salt may include without limitation copper hydroxide phosphate, copper phosphate, copper sulfate, cuprous thiocyanate, and the like, and combinations thereof. For example, the copper salt may be copper hydroxide phosphate. Copper hydroxide phosphate is a compound in which copper phosphate is combined with copper hydroxide, and examples thereof may include without limitation $Cu_3(PO_4)_2 \cdot 2Cu(OH)_2$, $Cu_3(PO_4)_2 \cdot Cu(OH)_2$, and the like, and combinations thereof. Copper hydroxide phosphate does not affect color-reproduction properties of a colorant, as an additive, and thus can allow a molded article having desired color to be easily obtained.

In exemplary embodiments, the metal compound may have an average particle diameter of about 0.01 μm to about 50 μm, for example, about 0.1 μm to about 30 μm, and as another example about 0.5 μm to about 10 μm. Within this range, it is possible to uniformly form a coating surface in direct coating or laser structuring.

As used herein, unless otherwise stated, the term "average particle diameter" refers to D50 (a diameter at a distribution rate of 50%) which is a number average particle diameter.

In exemplary embodiments, the metal compound may take a form in which a material such as mica, talc, and/or titanium oxide is coated on and/or otherwise bonded to a metal oxide, a heavy metal complex oxide, and/or a copper salt. Here, mica, talc, and/or titanium oxide may be coated on and/or bonded to a surface of the metal compound (a metal oxide, a heavy metal complex oxide, and/or a copper salt) in an amount of about 10 parts by weight to about 40 parts by weight based on about 100 parts by weight of the metal compound. In some embodiments, the metal compound can include a material such as mica, talc, and/or titanium oxide in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 parts by weight. Further, according to some embodiments of the present invention, the material such as mica, talc, and/or titanium oxide can be present in an amount of from about any of the foregoing amounts to about any other of the foregoing amounts.

Use of the polycarbonate resin composition including the metal compound (B) allows a circuit pattern to be realized in a desired form by direct laser treatment of a molded article, and can also eliminate a need for chemicals used in electroplating, thereby simplifying the overall process.

In exemplary embodiments, the polycarbonate resin composition can include the metal compound (B) in an amount of about 1 wt % to about 15 wt %, for example, about 3 wt % to about 12 wt %, and as another example about 5 wt % to about 10 wt %, based on the total weight (100 wt %) of the polycarbonate resin composition including the polycarbonate resin (A), the metal compound (B), and the glass transition temperature regulator (C). In some embodiments, the polycarbonate resin composition can include the metal compound (B) in an amount of about 1, 2, 3, 4, 5, 6, 7, 8, 9, 10, 11, 12, 13, 14, or 15 wt %. Further, according to some embodiments of the present invention, the metal compound (B) can be present in an amount of from about any of the foregoing amounts to about any other of the foregoing amounts.

Within this range, the polycarbonate resin composition (or a molded article) can easily realize fine patterns upon direct coating or laser structuring while exhibiting excellent properties in terms of flowability (moldability) and the like.

(C) Glass Transition Temperature Regulator

The glass transition temperature regulator can serve to decrease a glass transition temperature (Tg) of the polycarbonate resin (for example, by about 5° C. to about 10° C.), thereby improving flowability (processability) and plating adhesive strength of the polycarbonate resin composition with minimal or no deterioration in mechanical properties, and may include a phosphorus-containing compound.

In exemplary embodiments, the glass transition temperature regulator may be a cyclic phosphazene.

In exemplary embodiments, the glass transition temperature regulator may be a compound (phosphazene) represented by Formula 1:

[Formula 1]

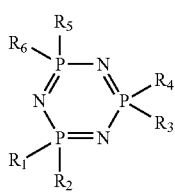

wherein $R_1$ to $R_6$ are the same or different and are each independently a hydrogen atom, a halogen atom, a substituted or unsubstituted $C_1$ to $C_{20}$ alkyl group, a substituted or unsubstituted $C_2$ to $C_7$ alkenyl group, a substituted or unsubstituted $C_3$ to $C_{20}$ cycloalkyl group, a substituted or unsubstituted $C_2$ to $C_{20}$ heterocycloalkyl group, a $C_1$ to $C_{20}$ alkoxy group, a $C_6$ to $C_{20}$ aryl group, a $C_5$ to $C_{20}$ heteroaryl group, a substituted or unsubstituted $C_3$ to $C_{20}$ alkoxycarbonylalkyl group, a substituted or unsubstituted $C_2$ to $C_{10}$ carbonylalkyl group, an amino group, or a hydroxyl group.

As used herein, the term "substituted" means that a hydrogen atom in a functional group is substituted with a substituent such as a $C_1$ to $C_{10}$ alkyl group, a halogen atom, a nitro group, a cyano group, a hydroxyl group, an amino group, a $C_6$ to $C_{10}$ aryl group, a $C_3$ to $C_{10}$ cycloalkyl group, a $C_3$ to $C_{10}$ heterocycloalkyl group, a $C_4$ to $C_{10}$ heteroaryl group, and combinations thereof.

In addition, the terms "alkyl", "alkoxy", and other substituted compounds containing "alkyl" include linear or branched compounds; the term "alkenyl" includes linear or branched $C_2$ to $C_8$ compounds including at least one double bond; and the term "cycloalkyl" includes $C_3$ to $C_{20}$ saturated monocyclic or saturated bicyclic compounds. The term "aryl" refers to an organic radical derived from an aromatic hydrocarbon by removing one hydrogen atom and includes a monocyclic and/or fused polycyclic ring system which contains 4 to 7, for example 5 to 6 cyclic atoms, in each ring. Examples of the aryl may include phenyl, naphthyl, biphenyl, and tolyl, without being limited thereto.

The term "heterocycloalkyl" refers to a cycloalkyl group which includes 1 to 3 heteroatoms selected from N, O, and/or S as a hydrocarbon backbone atom and includes carbon as remaining saturated monocyclic or bicyclic backbone atoms, and examples thereof may include without limitation pyrrolidinyl, azetidinyl, pyrazolidinyl, oxazolidinyl, piperidinyl, piperazinyl, morpholinyl, thiomorpholinyl, thiazolidinyl, hydantoinyl, valerolactamyl, oxiranyl, oxetanyl, dioxolanyl, dioxanyl, oxathiolanyl, oxathianyl, dithianyl, dihydrofuranyl, tetrahydrofuranyl, dihydropyranyl, tetrahydropyranyl, tetrahydropyridinyl, tetrahydropyrimidinyl, tetrahydrothiophenyl, tetrahydrothiopyranyl, diazepanyl, azepanyl, and the like, and combinations thereof.

The term "heteroaryl" refers to an aryl group which includes 1 to 3 heteroatoms selected from N, O, and/or S as an aromatic ring backbone atom and includes carbon as remaining aromatic ring backbone atoms. The heteroaryl group includes a divalent aryl group in which heteroatoms in a ring are oxidized or quaternized to form, for example, N-oxides or quaternary salts. Examples of the heteroaryl may include without limitation furyl, thiophenyl, pyrrolyl, pyranyl, imidazolyl, pyrazolyl, thiazolyl, thiadiazolyl, isothiazolyl, isoxazolyl, oxazolyl, oxadiazolyl, triazinyl, tetrazenyl, triazolyl, tetrazolyl, furazanyl, pyridyl, pyrazinyl, pyrimidinyl, pyridazinyl, and the like, and combinations thereof.

In exemplary embodiments, the glass transition temperature regulator may include at least one of a compound represented by Formula 1a, a compound represented by Formula 1b, and/or a compound represented by Formula 1c:

[Formula 1a]

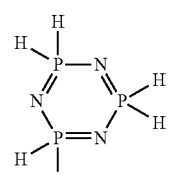

[Formula 1b]

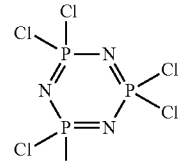

[Formula 1c]

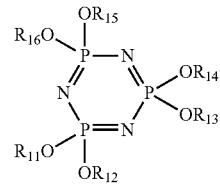

wherein $R_{11}$, $R_{12}$, $R_{13}$, $R_{14}$, $R_{15}$, and $R_{16}$ are the same or different and are each independently a hydrogen atom, a $C_1$ to $C_6$ alkyl group, a phenyl group, or a benzyl group.

In exemplary embodiments, the polycarbonate resin composition can include the glass transition temperature regulator (C) in an amount of about 1 wt % to about 10 wt %, for example, about 1 wt % to about 8 wt %, and as another example about 3 wt % to about 5 wt %, based on the total weight (100 wt %) of the polycarbonate resin composition including the polycarbonate resin (A), the metal compound (B), and the glass transition temperature regulator (C). In some embodiments, the polycarbonate resin composition can include the glass transition temperature regulator (C) in an amount of about 1, 2, 3, 4, 5, 6, 7, 8, 9, or 10 wt %. Further, according to some embodiments of the present invention, the glass transition temperature regulator (C) can be present in an amount of from about any of the foregoing amounts to about any other of the foregoing amounts.

Within this range, the glass transition temperature regulator can decrease the glass transition temperature of the polycarbonate resin composition (or molded article), and the polycarbonate resin composition thus can exhibit excellent properties in terms of impact resistance, flowability, plating adhesive strength, and balance therebetween.

In exemplary embodiments, an amount ratio (weight ratio) of the metal compound (B) to the glass transition temperature regulator (C) may range from about 1:about 1 to about 5:about 1, for example, about 1:about 1 to about 3.5:about 1. Within this range, the polycarbonate resin composition (or molded article) can exhibit further improved properties in terms of impact resistance, flowability, plating adhesive strength, and balance therebetween.

The polycarbonate resin composition according to exemplary embodiments of the invention may further include one or more additives, as needed. Examples of the additives may include without limitation antibacterial agents, heat stabilizers, antioxidants, release agents, photostabilizers, inorganic additives, surfactants, coupling agents, plasticizers, compatibilizers, lubricants, antistatic agents, colorants, dyes, pigments, flame retardants, flame retardant aids, anti-dripping agents, weathering stabilizers, UV absorbers, UV blockers, and the like, and combinations thereof. For example, the additives may include antioxidants, lubricants, and combinations thereof to reduce decomposition of the polycarbonate resin during manufacture of a molded article using the polycarbonate resin composition while improving processability of the resin composition.

Examples of the antioxidants may include without limitation phenol-type, phosphite-type, thioether-type and/or amine-type antioxidants, and examples of the lubricants may include without limitation polyethylene wax and the like.

Examples of the release agents may include without limitation fluorine-containing polymers, silicone oils, metal salts of stearic acid, metal salts of montanic acid, montanic ester waxes, and/or polyethylene waxes; examples of the inorganic additives may include without limitation glass fibers, carbon fibers, silica, mica, alumina, clay, calcium carbonate, calcium sulfate, and/or glass beads; and examples of the colorants may include without limitation titanium dioxide and/or carbon black. In addition, examples of the carbon black may include without limitation graphitized carbon, furnace black, acetylene black, and/or Ketjen black.

Examples of the flame retardants may include without limitation phosphorus flame retardants, nitrogen flame retardants, and/or halogen flame retardants, and examples of the flame retardant aids may include without limitation antimony oxide.

Examples of the anti-dripping agents may include without limitation polytetrafluoroethylene, and examples of the weathering stabilizers may include without limitation benzophenone-type and/or amine-type weathering stabilizers.

In exemplary embodiments, the additives may be present in an amount of about 0.1 parts by weight to about 20 parts by weight, for example, about 0.1 parts by weight to about 15 parts by weight, based on about 100 parts by weight of the polycarbonate resin (A), the metal compound (B), and the glass transition temperature regulator (C).

The polycarbonate resin composition may have a plating peel strength of about 1.35 N/mm or higher, for example, about 1.40 N/mm to about 3.00 N/mm, and as another example about 1.45 N/mm to about 1.52 N/mm, as measured on a plate-type injection molded specimen having a size of about 1 mm×about 5 cm×about 5 cm (thickness×width×length) and left for aging at room temperature for 6 hours using a tensile tester after a surface of the specimen is activated in a stripped pattern using a laser, followed by Cu electroless plating to a thickness of about 35 μm.

The polycarbonate resin composition may have a flow length (spiral flow length, unit: mm) of about 100 mm to about 300 mm, for example, about 150 mm to about 250 mm, and as another example about 163 to about 170 mm, as measured on a specimen prepared by injection molding under conditions of a molding temperature of about 310° C., a mold temperature of about 60° C., an injection pressure of about 50%, and an injection rate of about 50% using a spiral mold having a size of about 1 mm×about 1 cm (thickness×width).

The polycarbonate resin composition may have an impact resistance of about 50 cm to about 100 cm, for example, about 60 cm to about 80 cm, and as another example about 65 cm to about 73 cm, as measured on a plate-type injection molded specimen having a size of about 1 mm×about 5 cm×about 5 cm (thickness×width×length) and left for aging at room temperature for 6 hours using a falling weight impact tester with a 500 g weight in accordance with the DuPont drop test method, in which the impact resistance is found by impacting 20 specimens with the weight to measure a height of the weight at which about 50% of each specimen is broken, followed by averaging values of the height.

A molded article may be produced from the polycarbonate resin composition as set forth above. For example, the polycarbonate resin composition may be produced into a molded article through various molding methods, such as injection molding, double injection molding, blow molding, extrusion, and compression molding. Such molding methods are well known to those skilled in the art. The polycarbonate resin composition (or molded article) may be applied to various fields such as a variety of electric/electronic products and automotive parts, and can be useful as a molded article using laser direct structuring (LDS).

Through repeated testing, it could be confirmed that the numerical limitations as described above can have critical significance in that the polycarbonate resin composition (molded article) according to the present invention can have excellent mechanical properties and processability while exhibiting improved plating adhesive strength, thereby efficiently realizing a metal microcircuit.

Hereinafter, the present invention will be described in more detail with reference to the following examples. It should be understood that these examples are provided for illustration only and are not to be construed in any way as limiting the present invention.

EXAMPLES

Details of components used in the following Examples and Comparative Examples are as follows:

(A) Polycarbonate Resin

A polycarbonate resin (SC-1190, Samsung SDI) is used.

(B) Metal Compound

Copper chromium oxide ($CuCr_2O_4$) (Black 1G SHEPHERD Color Company) is used.

(C) Glass Transition Temperature Regulator

Cyclic phosphazene (Rabitle FP 110, FUSHIMI Pharmaceuticals) is used.

(D) Additive (D-1) Lubricant

Polyethylene wax (HI-WAX 400P, MITSUI PETROCHEMICAL) is used.

(D-2) Antioxidant

Bis(2,4-dicumylphenyl)pentaerythritol diphosphite (Doverphos S-9228 PC, DOVER CHEMICAL) is used.

Examples 1 to 3 and Comparative Examples 1 to 4

Polycarbonate resin compositions of the Examples and Comparative Examples are prepared in amount ratios as listed in Table 1. The amount of each of (A), (B), and (C) is represented in % by weight (wt %) based on the total weight of (A), (B), and (C), and the amount of (D) is represented in parts by weight based on 100 parts by weight of (A), (B), and (C).

The components are added in amounts as listed in Table 1 and dry-mixed, followed by extrusion using a twin-screw type extruder (φ=45 mm) at a barrel temperature of 250° C. to 280° C., thereby preparing pellets. Then, the prepared pellets are dried at 100° C. for 3 hours or more, followed by injection molding, thereby preparing a specimen for property evaluation.

TABLE 1

|  | Example | | | Comparative Example | | | |
|---|---|---|---|---|---|---|---|
|  | 1 | 2 | 3 | 1 | 2 | 3 | 4 |
| (A) Polycarbonate resin | 87 | 85 | 90 | 90 | 70 | 94.5 | 78 |
| (B) Metal compound | 10 | 10 | 5 | 10 | 10 | 0.5 | 17 |
| (C) Glass transition temperature regulator | 3 | 5 | 5 | — | 20 | 5 | 5 |
| (D) (D-1) Lubricant | 0.3 | 0.3 | 0.3 | 0.3 | 0.3 | 0.3 | 0.3 |
| (D-2) Antioxidant | 0.3 | 0.3 | 0.3 | 0.3 | 0.3 | 0.3 | 0.3 |

The polycarbonate resin compositions of Examples 1 to 5 and Comparative Examples 1 to 5 are evaluated as to plating adhesive strength, impact resistance, and flowability. Results are shown in Table 2.

Property Evaluation (1) Plating adhesive strength (N/mm): A plate-type specimen having a size of 1 mm×5 cm×5 cm (thickness×width×length) is prepared by injection molding and then left for aging at room temperature for 6 hours. Then, a surface of the specimen is activated in a stripe pattern using a laser, and Cu is deposited onto the surface to a thickness of 35 μm by electroless plating, followed by measurement of plating peel strength (unit: N/mm) using a tensile tester.

(2) Impact resistance (cm): A plate-type specimen having a size of 1 mm×5 cm×5 cm (thickness×width×length) is prepared by injection molding and then left for aging at room temperature for 6 hours. 20 specimens are subjected to impact testing using a falling weight impact tester with a 500 g weight in accordance with the DuPont drop test method to measure a height of the weight at which 50% of each specimen is broken, followed by averaging values of the height.

(3) Flow length (mm): Flow length (spiral flow length, unit: mm) is measured on a specimen prepared by injection molding under conditions of a molding temperature of 310° C., a mold temperature of 60° C., an injection pressure of 50%, and an injection rate of 50% using a spiral mold having a size of 1 mm×1 cm (thickness×width).

TABLE 2

|  | Example | | | Comparative Example | | | |
|---|---|---|---|---|---|---|---|
|  | 1 | 2 | 3 | 1 | 2 | 3 | 4 |
| Plating adhesive strength (N/mm) | 1.45 | 1.47 | 1.52 | 1.33 | 1.78 | Not plated | 1.21 |
| Impact resistance (cm) | 65 | 68 | 73 | 69 | 42 | 85 | 34 |
| Flow length (mm) | 170 | 165 | 163 | 125 | 222 | 168 | 170 |

From the results shown in Table 2, it can be seen that the polycarbonate resin compositions of Examples 1 to 3 including the glass transition temperature regulator (C) according to the present invention have excellent flowability and enhanced plating adhesive strength as compared with Comparative Example 1, which does not include the glass transition temperature regulator (C).

In addition, it can be seen that the polycarbonate resin compositions of Examples 1 to 3 prepared according to composition of the present invention have excellent properties in terms of plating adhesive strength, impact resistance, and flowability, as compared with Comparative Examples 2 to 4, which include polycarbonate resin, metal compound, and/or glass transition temperature regulator in amount ratios deviating from the present invention and thus could satisfy properties required for an exterior material for electronic equipment.

In other words, the polycarbonate resin compositions of Examples 1 to 3 according to the present invention have a good balance between plating adhesive strength, impact resistance, and flowability, whereas the polycarbonate resin compositions of Comparative Examples 1 to 4 exhibit poor properties in terms of plating adhesive strength, impact resistance and/or flowability and thus could not be applied to actual products.

Therefore, it was proven that the numerical limitations as described above have critical significance in that the polycarbonate resin composition according to the present invention have excellent properties in terms of plating adhesive strength, impact resistance flowability.

Although some embodiments have been described above, it should be understood that these embodiments are provided for illustration only and are not to be construed in any way as limiting the present invention, and that various modifications, changes, alterations, and equivalent embodiments can be made by those skilled in the art without departing from the spirit and scope of the invention. Therefore, the scope of the present invention should be defined by the appended claims and equivalents thereof.

What is claimed is:

1. A polycarbonate resin composition, comprising:
   about 75 wt % to about 95 wt % of a polycarbonate resin;
   about 1 wt % to about 15 wt % of a metal compound comprising at least one of a heavy metal complex oxide represented by Formula 3 and a copper salt:

$$AB_2O_4 \qquad \text{[Formula 3]}$$

wherein A is copper; and B is chromium; and
   about 1 wt % to about 10 wt % of a glass transition temperature regulator including phosphorus,
   wherein a weight ratio of the metal compound to the glass transition temperature regulator ranges from about 1:about 1 to about 5:about 1.

2. The polycarbonate resin composition according to claim 1, wherein the glass transition temperature regulator is a compound represented by Formula 1:

[Formula 1]

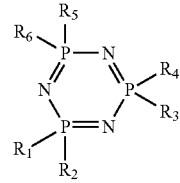

wherein $R_1$ to $R_6$ are the same or different and are each independently a hydrogen atom, a halogen atom, a substituted or unsubstituted $C_1$ to $C_{20}$ alkyl group, a substituted or unsubstituted $C_2$ to $C_7$ alkenyl group, a substituted or unsubstituted $C_3$ to $C_{20}$ cycloalkyl group, a substituted or unsubstituted $C_2$ to $C_{20}$ heterocycloalkyl group, a $C_1$ to $C_{20}$ alkoxy group, a $C_6$ to $C_{20}$ aryl group, a $C_5$ to $C_{20}$ heteroaryl group, a substituted or unsubstituted $C_3$ to $C_{20}$ alkoxycarbonylalkyl group, a substituted or unsubstituted $C_2$ to $C_{10}$ carbonylalkyl group, an amino group, or a hydroxyl group.

3. The polycarbonate resin composition according to claim 1, wherein the metal compound has a spinel structure.

4. The polycarbonate resin composition according to claim 1, further comprising: at least one additive selected from the group consisting of antibacterial agents, heat stabilizers, antioxidants, release agents, photostabilizers, inorganic additives, surfactants, coupling agents, plasticizers, compatibilizers, lubricants, antistatic agents, colorants, dyes, pigments, flame retardants, flame retardant aids, anti-dripping agents, weathering stabilizers, UV absorbers, UV blockers, and combinations thereof.

5. The polycarbonate resin composition according to claim 1, wherein the polycarbonate resin composition has a plating peel strength of about 1.35 N/mm or higher, as measured on a plate-type injection molded specimen having a size of about 1 mm×about 5 cm×about 5 cm (thickness×width×length) and left for aging at room temperature for 6 hours using a tensile tester after a surface of the specimen is activated in a stripe pattern using a laser, followed by Cu electroless plating to a thickness of about 35 μm.

6. The polycarbonate resin composition according to claim 1, wherein the polycarbonate resin composition has an impact resistance of about 50 cm to about 100 cm, as measured on a plate-type injection molded specimen having a size of about 1 mm×about 5 cm×about 5 cm (thickness×width×length) and left for aging at room temperature for 6 hours using a falling weight impact tester with a 500 g weight in accordance with DuPont drop test method, in which the impact resistance is found by impacting 20 specimens with the weight to measure a height of the weight at which about 50% of each specimen is broken, followed by averaging values of the height.

7. The polycarbonate resin composition according to claim 1, wherein the polycarbonate resin composition has a flow length (spiral flow length) of about 100 mm to about 300 mm, as measured on a specimen prepared by injection molding under conditions of a molding temperature of about 310° C., a mold temperature of about 60° C., an injection pressure of about 50%, and an injection rate of about 50% using a spiral mold having a size of about 1 mm×about 1 cm (thickness×width).

8. A molded article manufactured using the polycarbonate resin composition according to claim 1.

* * * * *